May 4, 1954 A. GNÄHRICH 2,677,288
SPEED REDUCING TRANSMISSION MECHANISM
Filed July 6, 1951 4 Sheets-Sheet 1
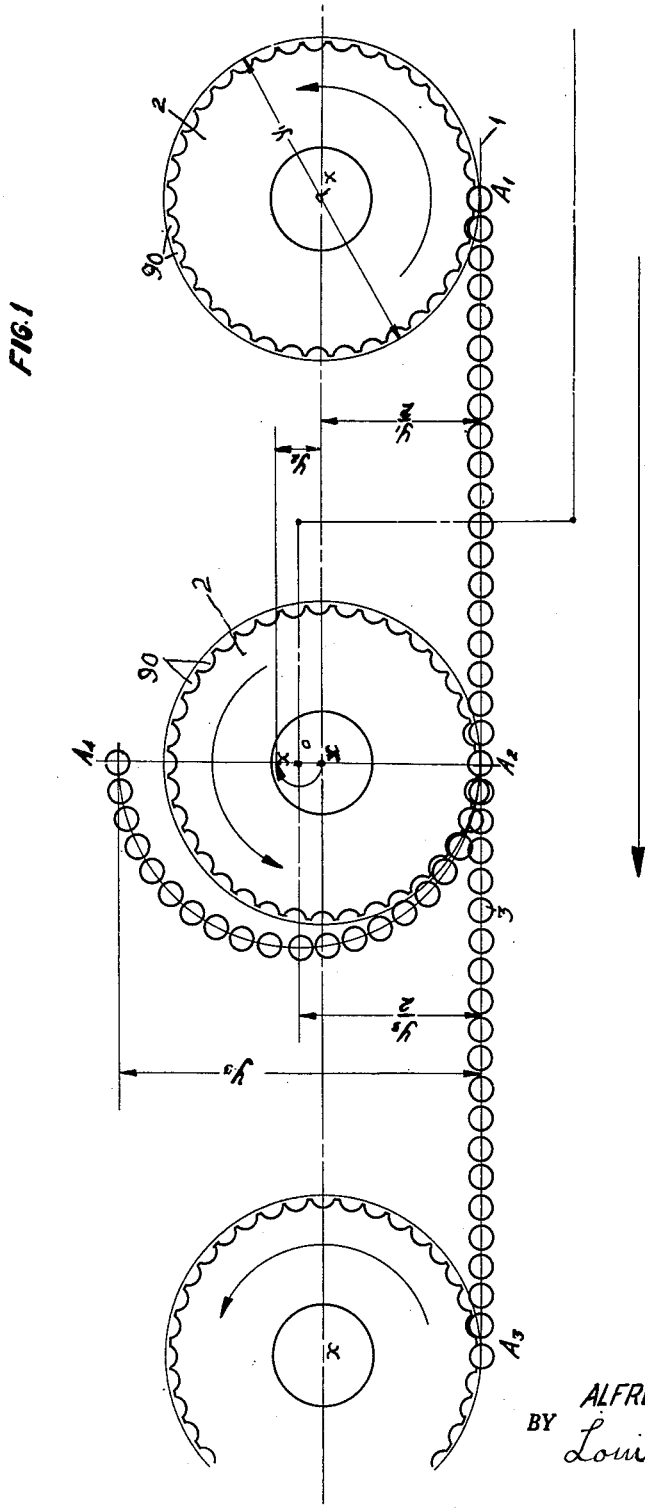
INVENTOR.
ALFRED GNAEHRICH
BY Louis C. Smith
Attorney.

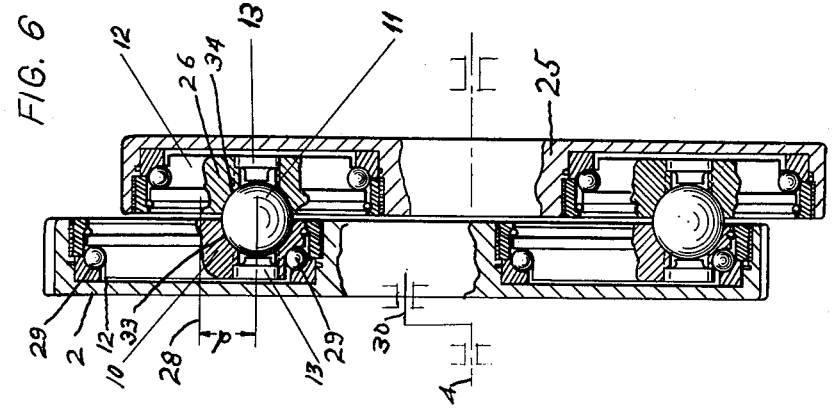
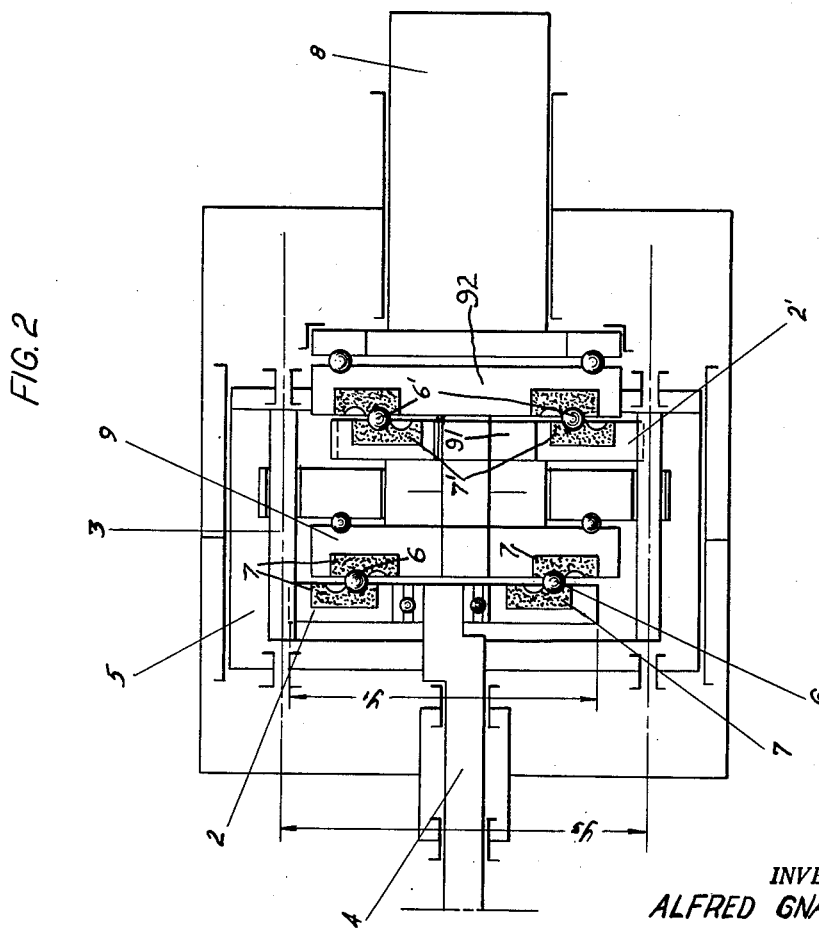

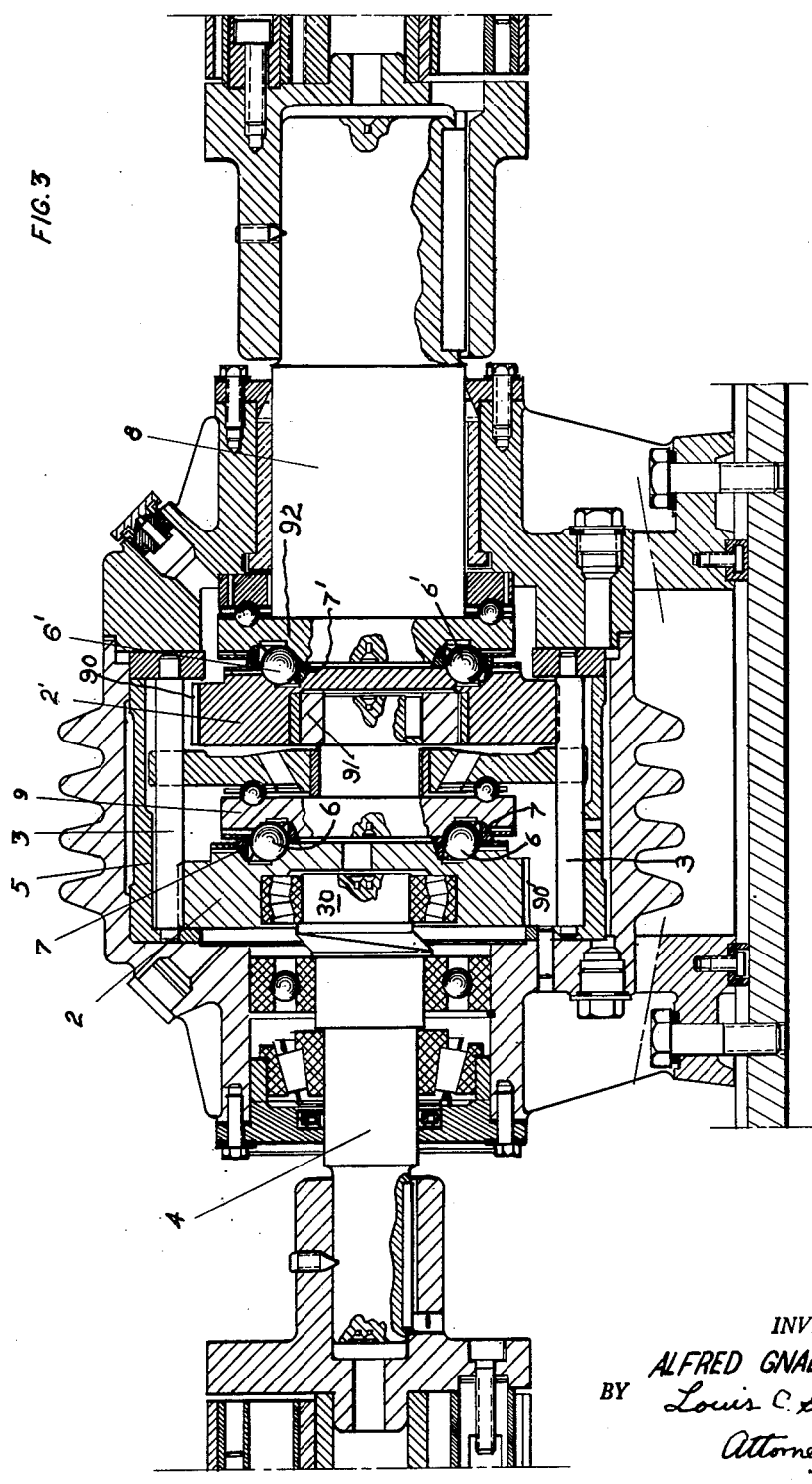

May 4, 1954  A. GNÄHRICH  2,677,288
SPEED REDUCING TRANSMISSION MECHANISM
Filed July 6, 1951  4 Sheets-Sheet 4
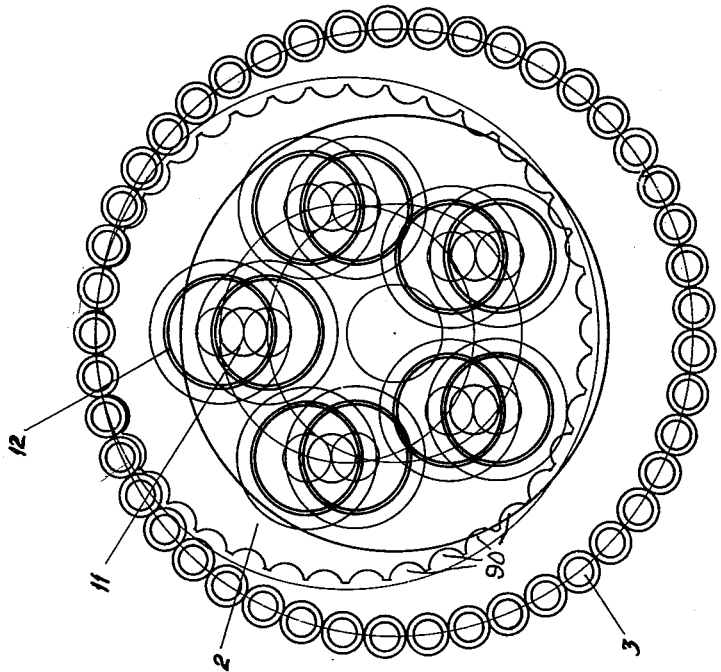
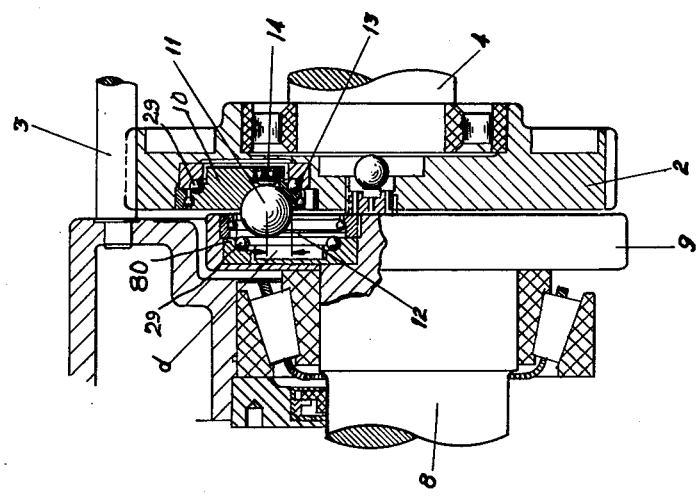
INVENTOR.
ALFRED GNAEHRICH
BY Louis C. Smith
Attorney.

UNITED STATES PATENT OFFICE 2,677,288

SPEED REDUCING TRANSMISSION MECHANISM

Alfred Gnährich, Mulhouse, France

Application July 6, 1951, Serial No. 235,478

7 Claims. (Cl. 74—804)

The present invention relates to a mechanism for the coaxial transmission of uniform rotary motion to a place of use with determinable constant reduction ratios which are produced and equalized by members to which a planetary motion is imparted.

The basis of the motion according to the present invention is structures known as "cam disks." In the known structures of this name used in eccentric drives of various designs and operation, the term "cam disks" is commonly used to define parts, the outer or inner periphery of which consists of radii of computed or geometrically developed shape, which run into or merge with each other, such radii generally being cycloids, hypocycloids, or circular arcs. Cam disks of this type have in common the disadvantages of costly manufacture due to the necessarily narrow manufacturing and operating tolerances in connection with the blank and the tool, as well as the disadvantage of low efficiency due to high friction values, inasmuch as in the classical application of cam disks of this construction, uniformly reduced rotary motion within drives of this kind can only be produced by sliding on a mating curve, and the number of curves determining the action is limited by the sliding angle at the mating curve, the resistance to sliding, and the tools employed.

In contradistinction to this, the cam disk used in accordance with this invention constitutes a considerably less precise article, the outer circumference of which is not provided with radii which run into or merge with each other, but is rather provided, by milling by the generation process without correction, with radii which are independent of each other.

The milled curve has a circumference of more than 90° and less than 180°. The pitch corresponds to the standard module or pitch series. This manner of production makes it possible to use pre-forged or pre-stamped blanks with a minimum cutting loss, and to get along with the ordinary operating means. The shaping, in accordance with this invention, makes it possible to use cutter steels of a strength of less than 50 kgms. per sq. mm., inasmuch as, except for annealing to remove stresses, there is no necessity for any heat treatment after the forging or milling.

The cam disk is journaled centrally on the crankpin of a crankshaft which is also journaled in the center line of the gearing. The curvilinear periphery of the cam disk bears, in this eccentric position, against cylindrical rollers, the diameter of which is congruent with the radii of curvature of the cam disk, which rollers are fixed, concentrically to the center line of the gearing, in a separate cage which is inserted in the gear housing, and the number of which, which also serves to determine the reduction ratio, has been established when laying out the gearing in accordance with the present invention.

From this it follows that the number of curves of the cam disk must be smaller than the number of rollers in the roller cage to an extent which corresponds to the crank radius of the crankshaft. The reduction ratio is derived and calculated from this difference.

When the crankshaft is turned, the cam disk is caused to swing in a circle. In the course of 360° of this motion, all the curves of the cam disk come into engagement with all the rollers of the roller cage. Inasmuch, however, as there is a difference between the number of curves and the number of rollers, the same number of curves of the cam disk will come twice into engagement in the course of one swing as the number of curves of the cam disk subtracted from the number of rollers of the roller cage. Therefore the cam disks will rotate on the crankpin in a direction opposite the direction of swing of the cam disk, i. e. the direction of rotation of the crankshaft.

The accompanying drawing shows several embodiments of the subject matter of the invention, of which:

Fig. 1 is a diagrammatic showing of the generation of the motion of the cam disk;

Fig. 2 is a diagrammatic representation of the device for effecting the transmission of this motion;

Fig. 3 shows a first embodiment of the subject matter of the invention in a longitudinal section corresponding to Fig. 2;

Fig. 4 shows a second embodiment in longitudinal section;

Fig. 5 is the same embodiment shown in transverse section;

Fig. 6 is a third embodiment of the transmission parts, shown in radial section.

In Fig. 1, the generation of the motion of the cam disk is represented symbolically:

Let it be assumed that 1 indicates a rack, the teeth of which are in the form of rollers or cylindrical bodies 3, and that a wheel, 2, which in the complete structure will constitute a cam disk, has a diameter $y1$ and is adapted to roll over the rack, during which rolling motion it turns about its axis $x$.

Let it also be assumed that the length of the rack from A1 to A3 is slightly greater than the periphery of the wheel 2, and that A2 is the center point of the rack so that the lengths A1—A2 and A2—A3 are equal.

If the portion A2—A3 of the rack is curved upwardly into the form of a semi-circle so as to bring the end A3 into the position shown at A4, and the cam disk 2 continues to roll over the upwardly curved portion of the track, said cam disk will leave the horizontal direction of translation of its center at point A2 and, following the symbolically curved rack, will move to point A4. The distances to A3 and A4 are equal. During this motion of the cam disk 2, its center line starting from point A2 and following rack 1 has also moved in a semi-circle of a diameter $y2$, and its axis $x$ is now at a distance $y2$ from the previous horizontal direction of translation. If one now imagines that the stretch from A1 to A2 is likewise curved upward in the shape of a semi-circle, so that A1 coincides with A4, then in such case the horizontal direction of translation of the axis of the cam disk 2 will change into a circular direction of translation, the diameter of which is equal to $y2$. If $y3$, the diameter produced by the curving together of rack 1, is constant, the diameter $y1$ of cam disk 2 determines the diameter $y2$ of the circular motion. The center $o$ of diameter $y2$ is accordingly the center of rack 1 and the center of the gearing.

While the cam disk 2, when moving horizontally, turns around its center a number of times which is equal to the ratio of its periphery to the distance A1—A3 of rack 1, cam disk 2 rotates about its center when the rack is closed only by the difference between its periphery and the closed rack, produced when A1 and A4 coincide. The ratio of the reduction is derived from this discovery.

Referring to Fig. 2, 4 indicates a crankshaft having a crankpin 30 which is offset to rotate in a circle corresponding to the circle of rotation $y2$ in Fig. 1, and 2 is a cam disk mounted on said crankpin and bearing in the direction of the offset of the crankshaft against one of the fixed rollers 3 carried by a roller cage 5 which corresponds to the closed rack produced by bringing together the ends A1 and A4 of the rack 1 shown in Fig. 1. Upon a 360° rotation of the crankshaft 30, cam disk 2 is bodily returned to its starting position, having however turned around its axis $x$ by the difference of the periphery of $y1$ as compared with $y3$ in Fig. 1.

If the designations, periphery and diameter are now replaced by, for example, 40 rollers in the former rack 1 which has now been converted into the roller cage 5, and by 36 curves or indentations 90 of the cam disk, 2, this means that a complete rotation of the crankshaft 4 has returned the cam disk 2 as a whole to the starting position, but that the cam disk 2 itself has, however, rotated an amount equal to four curves or indentations 90 on the crankpin, the center of which coincides with the center of the cam disk. In general, the number of revolutions $n_2$ of cam disk 2 can therefore be determined by the formula:

$$n_2 = n_4 \cdot \frac{(G-C)}{C}$$

in which formula:

$n_4$ is the number of revolutions of crankshaft 4 per minute;

G is the number of rollers 3;

C is the number of curves or indentations 90 on the periphery of the cam disk 2.

Of the two motions defined, only the rotary motion of the cam disk on the crankpin of the crankshaft is utilized, while the gyratory motion of the cam disk is without effect.

The rotary motion of the cam disk 2, which has been defined, is transmitted to the driven member, represented by the member 9 in Figs. 2 and 3, by six balls 6 of standard manufacture each of which rolls in an annular ball race developed in occordance with the invention and formed in a race member or ring 7 carried by the cam disk, this transmission taking place in such a manner that the gyratory movement of the cam disk 2 caused by the crankshaft 4 rolls out without any effect in the annular ball race, while there is only transmitted the rotation of cam disk 2 about its axis brought about by the difference between the number of rollers 3 and the number of curves 90 of the cam disk 2.

At equal distances from the center and also at an equal distance from each other, there are formed in the cam disk 2, as well as in the member 9, the race members or rings 7 which may be standardized and which can be replaced after wear, and the inner curvature of which corresponds to the radius of the ball, while the diameter of their race for balls 6 is equal to that of the circle of rotation of crankpin 30. Due to the continuously eccentric position of cam disk 2, caused by the offset of the crankshaft, and the continuously central position of the driven member 9 along the center line of the gearing, balls 6 continuously rest against the race diameter of the ring along the inner curvature. By the rotation of cam disk 2 during operation, the center of the diameter of the race of the rings 7 moves, in the cam disk 2 as the driving member, and in the member 9 as the driven member, laterally to the center line of the gearing. This displacement effects a complete revolution of part 9 when nine full rotations of crankshaft 4 have acted on cam disk 2.

The driving balls 6 transmit the rotation of the driving cam disk 2 completely, only when cam disk 2 is, on the crankpin of crankshaft 4, in that zone of its circle of swing which is opposite the direction of rotation of cam disk 2. After entering into the zone of the same direction as the direction of rotation of cam disk 2, the driving ball 6 is not held on its races of rings 7. When cam disk 2 again enters the zone opposite its direction of rotation, the geometric condition is again brought about, which will make itself noticeable by sudden rotations of the driven member 9, both in the cam disk 2 and member 9. By positive guiding of the driving balls 6 along their race circles by means of separate rings 7 or equalizing members, each having the form of the race circle with a recess for the driving ball 6, a uniform transmission of the rotation to the driven member is achieved.

This arrangement has the advantage of extremely simple manufacture, assembly and adjustment, as well as an easy exchangeability of all parts which have become worn.

The reduction of the driving speed to the desired driven speed is effected in the gearing by using any one of a plurality of different cam disks of different sizes and each with a different number of curves 90 in connection with a roller cage 5 of constant diameter $y3$ and having a constant member of rollers 3, for example, 40 rollers. By using six different cam disks 2 each with a different number of curves (for instance 38, 37, 36, 35, 34, and 33 curves) and each having a different diameter $y1$, and mounting each disk on a crankpin 30 which has the proper eccentricity to maintain the cam disk in engagement with the rolls 3 of the roller cage 5, six different speed reductions can be obtained.

If the driven or output member, such as the member 9 is located within the gearing and constitutes an element on to which the rotation of the first cam disk 2 is transmitted, and such element in turn is journaled for rotation concentrically within the gearing and is provided with a concentric shaft end which projects from its bearing in a direction opposite to that of the first cam disk 2, then according to the invention an eccentric piece 91 can be fitted on to this shaft end and a second cam disk 2' similar to the first cam disk 2, and which also has curves or indentations which cooperate with the rollers 3 can be mounted on the eccentric piece 91 in such a way that the curves or indentations of the second cam disk will engage the rollers 3 in the same manner as described with reference to the first cam disk 2. With this arrangement the gyratory motion of the second cam disk 2' will cause it to rotate backwardly on the eccentric piece 91 as described with reference to the first cam disk 2. Such rotary motion of the second cam disk 2' may be transmitted to a driven member, such as the shaft 8, by balls 6' operating in ball races in rings 7' carried by the second cam disk 2' and also by the member 92 mounted on the shaft 8 in the same manner as the rotation of the first cam disk 2 is transmitted to the driven member 9.

With this arrangement the number of gyrations of the second cam disk 2' will be equal to the R. P. M. of the first cam disk 2. Any desired number of cam disks can be arranged in series, within sensible limits. For example, the first cam disk may have 38 curves, the second cam disk also 38, or alternatively 37, or 36, or 35, or 34, or 33. Or, for example, the first cam disk may have 37 curves, the second cam disk also 37, or alternatively 36 or 35 or 34 or 33 etc. Or, for example, the first cam disk may have 38 curves, the second 35, and the third 36 curves.

Each member of curves corresponds to a certain reduction ratio. This possibility of individual combinations offers the advantage of almost unlimited possibilities of combinations as a whole.

The development of the gearing as a horizontal, vertical, inclined, or swingable gearing does not offer any difficulty.

Fig. 3 shows one industrial development of the device according to Figs. 1 and 2. The corresponding parts are provided with the same reference numbers.

In order to eliminate the disadvantage of wear of the race rings 7, these transmission parts are replaced, in the embodiment according to Figs. 4 to 6, by separate rotatable equalizing elements, the number of which is determined by the torque to be transmitted. Such equalizing elements are supported independently of each other on ball bearings and each is rotatable about an axis that is parallel to that of the cam disk.

The rotatable equalizing members in the cam disk 2 are indicated at 10 and each is mounted in ball bearings 29 in a recess 12, each equalizing member being rotatable about its axis 28, which as stated above is parallel to the axis of the eccentric portion 30 of the shaft 4. Each rotary equalizing member is provided with a semi-spherical recess 33 to receive a steel ball 11, which may be a ball of standard manufacture. The distance $d$ of the center line of the ball-receiving recess 33 from the axis 28 of rotation of the equalizing member 10 is equal to the crank radius of the crankshaft 4 on which the cam disk 2 is mounted, and this may be varied depending on the desired speed transmission ratio.

The driven member 9 shown in Fig. 4 is also provided with the rotatable equalizing members 80 similar in all respects to and corresponding with the equalizing members 10 of the driving member 2. Each equalizing member 80 is mounted in ball bearings 29 and rotates about an axis parallel to that of said driven member, and is also provided with a semi-spherical recess to receive a steel ball 11, each such recess being situated with its center located at one side of the axis of rotation of said equalizing member.

The rotatable equalizing members of the driving member or cam disk 2 and the driven member 9 are so disposed that each ball 11 is received partly in a ball-receiving recess 33 of an equalizing member 10 of the driving member or cam disk 2, and partly in a semi-spherical recess of an equalizing member 80 in the driven member 9, and thereby a driving connection is established between the driving and driven members.

During the gyratory motion of the driving member 2 the equalizing members will rotate about their axes and only the backward rotation of said driving member will be transmitted to the driven member through the balls 11, the gyratory motion of the driving member rolling out due to the rotation of the equalizing members.

If, for instance, there are 40 rollers 3 in the roller cage 5 and 36 curves or depressions 99 in the driving member 2, said driving member will make a complete backawrd rotation about the crank pin 30 when the crank shaft 4 has made nine full rotations.

In Fig. 6 there is shown an embodiment of the invention in which the driven member is indicated at 25 and has mounted therein rotatable members 26 each of which has a central ball-receiving recess 34 to receive the ball 11 so that each ball is on the axis of rotation of the corresponding member 26.

An important advantage of the construction shown in Figs. 4 and 6 is that, due to the rotary motion of the equalizing members 10 and 26 about their axes, the slow backward rotation of the driving member 2 is transmitted evenly and uniformly to the driven member 9 or 26 and thus to the driven shaft 8.

The bottom of each semi-spherical ball-receiving recess 33, 34 is provided with an adjusting member 13 by which the ball 11 can be raised from its seat to compensate for machining tolerances, thereby avoiding the necessity of extreme precision in manufacturing.

The structural dimensions of the equalizing members are standardized, thereby simplifying replacement of worn parts.

The gyratory motion of the cam disk 2 has no effect when rolling in these bodies of rotation inasmuch as the distance of each ball from the center of its body of rotation in the cam disk is equal to the radius of gyratory motion of the cam disk and the bodies of rotation are supported in roller bearings. Due to the fact, however, that the cam disk also has a motion of rotation about its axis which is opposite in direction to the direction of its gyratory motion, there takes place a lateral displacement of the driven member due to the driving balls, half of which are embraced in the rotary equalizing members of the cam disk, and half in the equalizing members of the driven member. For example, by a proper proportioning of the parts it can be brought about that this rotation covers a full circle after nine full rotations of the crankshaft have acted on the cam disk 2.

Considered geometrically, any desired point on the curved periphery of the cam disk describes an elongated endless spiral around the center line of the gearing, the longitudinal intervals of which are equal to the difference between the number of rollers 3 in the roller cage 5 and the number of curves 90 on the cam disk and the transverse intervals of which are equal to the diameter of the gyratory motion of the cam disk. This motion would theoretically bring about a non-uniform rotation of the driven shaft 8. However, due to the fact that, in the devices of Figs. 4 and 6, an imaginary line from the center of the rotatable equalizing member 10 of the cam disk 2 through the center of the driving ball 11 to the center of the equalizing member 26 of the driven shaft 8, is throughout the entire 360° gyratory motion the of cam disk 2, always in a radial line extending through the axis of the driven shaft and the particular curve or indentation 90 which at any instant is completely in engagement with a roller 3, the rotation of the driven shaft in the unit of time of the swinging of the cam will be de-accelerated in the zone of the longitudinal interval of the imaginary point, and accelerated in the zone of the transverse interval. This process causes a complete equalization of the non-uniform rotation of the cam disk, so as to produce a uniform rotation of the driven shaft 8. The transmission can be varied, depending on the distance $d$ selected. If, for instance, one-half the radius of the crankshaft is selected for $d$, a low-speed transmission with high power will be obtained. If, on the other hand, $d$ is equal to the radius of the crankshaft, the device will transfer a small amount of power at rapid speeds or vice versa, depending on the development of the gearing.

I claim:

1. A speed reducing power transmitting gearing comprising a driving shaft having an eccentric portion, a disk member mounted on said eccentric portion for rotation thereabout, said disk member having peripheral indentations, a stationary roller cage enclosing said disk member and having rollers to engage said indentations, the radius of the roller cage being larger than that of the disk member by the eccentricity of the eccentric portion of the driving shaft, whereby rotation of the driving shaft will produce a gyratory motion of the disk member and the engagement of the indentations in the disk member with the rollers of the roller cage will produce a rotation of the disk member at a reduced speed about its axis, a driven member coaxial with the driving shaft, said disk member having a plurality of separate circular ball races, each having a diameter corresponding to the eccentric portion of the driving shaft, a ball in each ball race, means providing an operative driving connection between each ball and the driven member by which the uniform rotation of the disk member about its axis is transmitted uniformly and evenly to the driven member unaffected by the gyratory motion of the disk member.

2. A speed reducing power transmitting gearing comprising a driving shaft having an eccentric portion, a disk member mounted on said eccentric portion for rotation thereabout, said disk member having peripheral indentations, a stationary roller cage enclosing said disk member and having rollers to engage said indentations, the radius of the roller cage being larger than that of the disk member by the eccentricity of the eccentric portion of the driving shaft, whereby rotation of the driving shaft will produce a gyratory motion of the disk member and the engagement of the indentations in the disk member with the rollers of the roller cage will produce a rotation of the disk member at a reduced speed about its axis, a driven member coaxial with the driving shaft, a plurality of rotary equalizing members mounted in the disk member to rotate about axes parallel to that of the driving shaft and all situated at the same distance from the center of said disk member, each equalizing member having a ball-receiving recess situated eccentrically thereof, and a ball in each ball-receiving recess, said driven member having recesses in which said balls are also received.

3. A speed reducing power transmitting mechanism as defined in claim 2, in which the recesses in the driven member all have the same radial distance from its axis of rotation.

4. A speed reducing power transmitting gearing comprising a driving shaft having an eccentric portion, a disk member mounted on said eccentric portion for rotation thereabout, said disk member having peripheral indentations, a stationary roller cage enclosing said disk member and having rollers to engage said indentations, the radius of the roller cage being larger than that of the disk member by the eccentricity of the eccentric portion of the driving shaft, whereby rotation of the driving shaft will produce a gyratory motion of the disk member and the engagement of the indentations in the disk member with the rollers of the roller cage will produce a rotation of the disk member at a reduced speed about its axis, a driven member coaxial with the driving shaft, a plurality of rotary equalizing members mounted in the disk member to rotate about axes parallel to that of the driving shaft, each equalizing member having a ball-receiving recess located a distance from its axis equal to the eccentricity of the eccentric portion of the driving shaft, a similar number of ball-receiving members mounted in the driven member to rotate about axes parallel to that of said driven member, each ball-receiving member having an axially located ball-receiving recess, and a plurality of balls, each of which is partially received in the ball-receiving recess of an equalizing member and partially received in the axial ball-receiving recess of a ball-receiving member.

5. A speed reducing power transmitting mechanism as defined in claim 2, in which a plurality of separate equalizing members equal in number to those in the disk member are mounted in the driven member to rotate about axes parallel to that of said driven member, each of said latter equalizing members also having a ball-receiving recess located eccentrically thereof and a ball received partly in the recess of each equalizing member carried by the disk member and partly in the corresponding equalizing member carried by the driven member.

6. A speed reducing power transmitting mechanism as defined in claim 5, in which the eccentricity of the ball-receiving recess in each equalizing member in both the disk member and the driven member is equal to one-half the eccentricity of the eccentric portion of the driving shaft.

7. A speed reducing power transmitting mechanism as defined in claim 2, in which the member driven by the disk member operates as a driving member to rotate a driven shaft, and driving connections similar to those between the disk member and the driven member are employed to drive the driven shaft from the driven member at a speed reduced below that of said driven member.

References Cited in the file of this patent

UNITED STATES PATENTS

| Number | Name | Date |
|---|---|---|
| 916,914 | Cooley | Mar. 30, 1909 |
| 1,641,766 | Laukhuff | Sept. 6, 1927 |
| 1,738,662 | Morison | Dec. 10, 1929 |
| 1,844,471 | Johnson | Feb. 9, 1932 |
| 2,520,282 | Henry | Aug. 29, 1950 |

FOREIGN PATENTS

| Number | Country | Date |
|---|---|---|
| 402,617 | Italy | Mar. 16, 1943 |